United States Patent [19]

Yasohara et al.

[11] Patent Number: 5,300,866
[45] Date of Patent: Apr. 5, 1994

[54] DRIVE APPARATUS AND SPEED CONTROL APPARATUS FOR BRUSHLESS MOTOR

[75] Inventors: Masahiro Yasohara, Amagasaki; Hiroyuki Oku, Takarazuka; Hiromitsu Nakano; Hiroshi Dohi, both of Osaka; Muneo Yamamoto, Takefu, all of Japan

[73] Assignee: Matsushita Electric Industrial Co., Ltd., Osaka, Japan

[21] Appl. No.: 908,813

[22] Filed: Jul. 8, 1992

Related U.S. Application Data

[63] Continuation of Ser. No. 665,126, Mar. 6, 1991, abandoned.

[30] Foreign Application Priority Data

| Mar. 7, 1990 | [JP] | Japan | 2-55331 |
| Mar. 30, 1990 | [JP] | Japan | 2-86543 |
| May 29, 1990 | [JP] | Japan | 2-141070 |
| Jun. 18, 1990 | [JP] | Japan | 2-159048 |
| Jul. 17, 1990 | [JP] | Japan | 2-188958 |

[51] Int. Cl.$^5$ .................. H02P 7/29; H02P 6/02
[52] U.S. Cl. ....................... 318/254; 318/431
[58] Field of Search .......... 318/138, 254, 430, 431, 318/439; 361/23, 30, 33

[56] References Cited

U.S. PATENT DOCUMENTS

| 3,229,179 | 1/1966 | Hetzel | 318/254 |
| 4,358,720 | 11/1982 | Abe | 318/254 |
| 4,370,690 | 1/1983 | Baker | 361/23 |
| 4,665,350 | 5/1987 | Angi et al. | 318/254 |
| 4,692,676 | 9/1987 | Dohi et al. | 318/269 |
| 4,748,386 | 5/1988 | Nakanishi et al. | 318/254 |
| 4,749,923 | 6/1988 | Chieng | 318/269 |
| 4,760,316 | 7/1988 | Hedlund | 318/254 |
| 4,782,272 | 11/1988 | Buckley et al. | 318/254 |
| 4,856,286 | 8/1989 | Sulfstede et al. | 62/89 |
| 4,912,378 | 3/1990 | Vukosavic | 318/254 |
| 4,928,043 | 5/1990 | Plunkett | 318/254 |
| 4,942,344 | 7/1990 | Devitt et al. | 318/254 |
| 4,950,968 | 8/1990 | Ogura | 318/599 |
| 4,983,895 | 1/1991 | Koharagi et al. | 318/254 |

FOREIGN PATENT DOCUMENTS

| 73839 | 3/1983 | European Pat. Off. |
| 179484 | 4/1986 | European Pat. Off. |
| 218017 | 4/1987 | European Pat. Off. |
| 1286179 | 8/1972 | United Kingdom |
| 1441374 | 6/1976 | United Kingdom |
| 2126026 | 3/1984 | United Kingdom |

*Primary Examiner*—Bentsu Ro
*Attorney, Agent, or Firm*—Lowe, Price, LeBlanc & Becker

[57] ABSTRACT

A drive apparatus for use in a brushless motor with a rotor and a drive coil assembly. The drive apparatus comprises an energization-state instruction circuit for generating an energization-state instruction signal instructing an energization state of the drive coil assembly on the basis of the position detection signal indicative of a position of the rotor and an energization switching circuit for outputting an energization switching signal to successively switch the energization state of the drive coil assembly in accordance with the energization-state instruction signal and a duty control signal. A power circuit is coupled to a direct-current voltage source and is responsive to the energization switching signal so as to energize the drive coil assembly by means of a direct-current voltage from the direct-current voltage source in accordance with the energization switching signal therefrom. A duty control circuit is responsive to a speed instruction signal from a speed instruction circuit and a motor speed signal from a speed detecting circuit for outputting the duty control signal to the energization switching circuit so as to control a duty ratio of the energization-state instruction signal on the basis of the duty control signal so as to output the energization switching signal to be inputted to the power circuit.

9 Claims, 13 Drawing Sheets

DRIVE APPARATUS AND SPEED CONTROL APPARATUS FOR BRUSHLESS MOTOR

This application is a continuation of application Ser. No. 07/665,126 filed Mar. 6, 1991 now abandoned.

BACKGROUND OF THE INVENTION

The present invention relates to a drive apparatus and speed control apparatus for a brushless motor to be employed for home-use equipment such as an air conditioner and a hot-water supply device.

Alternating-current electric motors (which will be referred hereinafter to as ac motors) are often utilized as a drive motor for home-use equipment such as an air conditioner and a hot-water supply device, and fan motors for use in the air conditioners and hot-water supply devices are required to be variable in speed so as to adjust the quantity of air to be blown thereby. Generally, the ac motor can be driven with a direct connection to an alternating-current power source (a commercial power source) so as to give an advantage in terms of very easy handling, while difficulty is encountered to change its rotational speed Accordingly, instead of such an ac motor, direct-current brushless motors (which will be referred hereinafter to as dc brushless motors) are frequently used however, such as motor can easily change its rotational speed. One example of drive apparatus of the conventional dc brushless motors is illustrated in FIG. 1. A description will be made hereinbelow with reference to FIG. 1 in terms of the drive apparatus of the conventional brushless motor. In FIG. 1, a position-detecting circuit 1106 is responsive to the output signal of a position sensor 1105 so as to output a position detection signal. An energization switching circuit 1107 outputs an energization switching signal for drive coils 1101a to 1101c of the motor on the basis of the position detection signal. This energization switching signal is power-amplified by means of a power circuit 1108 before successively switching the energization states of the drive coils 1101a to 1101c so as to drive the motor. A power from a commercial power source 1102 is rectified and smoothed through a rectifying and smoothing circuit 1103 so as to produce a dc voltage which in turn, drives a switching power source 1104. The switching power source 1104 varies the dc voltage to be applied to the power circuit 1108 so as to change the rotational speed of the motor.

There is a problem which arises with such an arrangement of the drive apparatus of the brushless motor, however, in that the switching power source should be required in order to change the rotational speed of the motor and a number of elements such as coils, capacitors and resistors are required for constituting the switching power source so that a number of mounting spaces are required for constituting the system which makes it difficult to simplify the system and reduce the weight and size of the system, thereby increasing the system cost.

SUMMARY OF THE INVENTION

It is therefore an object of the present invention to provide a drive apparatus of a brushless motor which is capable of adequately changing the rotational speed without using the switching power source and accurately obtaining the rotational speed.

Another object of this invention to provide a drive apparatus of a brushless moor which is capable of preventing damage, reducing heat generation, and improving the anti-noise characteristic.

A further object of this invention to provide a speed control apparatus of a brushless motor which is capable of performing a stable rotation without generating noises and vibration.

In accordance with the present invention, there is provided a drive apparatus for use in a brushless motor with a rotor, the drive apparatus comprising: multi-phase drive coil means for driving the motor; position detecting means for detecting a position of the rotor to be driven by an energization of the drive coil means; energization-state instruction means for generating an energization-state instruction signal instructing an energization state of the drive coil means on the basis of the position detection signal from the position detecting means; energization switching means for outputting an energization switching signal to successively switch the energization state of the drive coil means in accordance with the energization-state instruction signal from the energization-state instruction means and a duty control signal; power circuit means coupled to a direct-current voltage source and responsive to the energization switching signal from energization switching means so as to energize the drive coil means by means of a direct-current voltage from the direct-current voltage source in accordance with the energization switching signal therefrom; speed detecting means for outputting a motor speed signal on the basis of the position detection signal to be outputted from the position detecting means; speed instruction means for outputting a signal to instruct a speed of the motor; duty control means responsive to the speed instruction signal from the speed instruction means and the motor speed signal from the speed detecting means for outputting the duty control signal to the energization switching means so that the energization switching means controls a duty ratio of the energization-state instruction signal from the energization-state instruction means on the basis of the duty control signal so as to output the energization switching signal to be inputted to the power circuit means.

In accordance with the present invention, there is further provided a drive apparatus for use in a brushless motor comprising: multi-phase drive coil means for driving said motor; position detecting means for detecting a position of a rotor of said motor; energization-state instruction means for outputting an energization-state instruction signal on the basis of said position detection signal from said position detecting means; speed detecting means responsive to said position detecting means for outputting a signal indicative of a motor speed on the basis of said position detection signal; speed instruction means for outputting a motor-speed instruction signal; and duty control means responsive to said speed detection signal from said speed detecting means, said speed instruction signal from said speed instruction means, and said energization-state instruction signal from said energization-state instruction means so as to chopping an ON time period of said energization-state instruction signal with a carrier frequency to generate an energization switching signal which is supplied to a power circuit means coupled to a constance direct-current voltage of a constant direct-current voltage source so that a rotational speed of said motor becomes constant in accordance with said speed instruction signal from said speed instruction means.

Preferably, the constant direct-current voltage source produces the contact direct-current voltage by directly rectifying and smoothing a power supplied from a commercial power source, and the duty control means includes: a first converter coupled to said speed detecting means for converting said motor speed detection signal into an analog voltage corresponding to a frequency of said motor speed detection signal; a second converter coupled to said speed instruction means for converting said speed instruction signal into an analog voltage corresponding to a frequency or a duty ratio of said speed instruction signal, said duty ratio being a ratio of an ON time that said speed instruction signal is in a high-level state to an OFF time that it is in a low-level state; a conversion gain adjusting circuit coupled to said second converter for adjusting a conversion gain of said second converter to a predetermined value; a speed-error amplifier for amplifying an error between an output signal of said first converter and an output signal of said second converter so as to output an error signal; an oscillator for performing oscillation with a predetermined frequency; and a comparator for comparing said error signal of said speed error amplifier in voltage with an oscillation signal of said oscillator to perform control in accordance with the comparison result so that a rotational speed of said motor becomes equal to a speed corresponding to said ratio of the ON time and OFF time of said speed instruction signal or corresponding to the frequency of said speed instruction signal.

In accordance with the present invention, there is further a drive apparatus for use in a brushless motor comprising: multi-phase drive coil means for driving said motor; power source means for applying a voltage to said drive coil means; first circuit means comprising first switching means provided between said drive coil means and one terminal of said power source means, at least one of said first and second switching means being composed of a switching element and a diode coupled to an output of said switching element in its forward direction; second switching means provided between said drive coil means and the other terminal of said power source means; energization instruction means for successively supplying an energization instruction signal; and second circuit means responsive to said energization instruction signal from said energization instruction means so as to combine a signal with said energization instruction signal to supply the combination signal to said first and second switching means whereby a feed amount to said drive coil means varies in accordance with a pulse width of said combination signal.

In accordance with the present invention, there is further a speed control apparatus for use in a brushless motor comprising: speed instruction means for outputting an instruction signal indicative of a reference speed of said motor; torque instruction means for outputting an instruction signal indicative of a feed amount to said motor so that said motor is driven at a speed corresponding to said instruction signal from said speed instruction means; motor drive means for feeding a power to said motor on the basis of said instruction signal from said torque instruction means; and low-speed instruction protection means for stopping the feed to said motor when a motor speed corresponding to of said instruction signal from said speed instruction means is lower than a predetermined value.

In accordance with the present invention, there is further a speed control apparatus for use in a brushless motor comprising: speed instruction means for outputting a speed instruction signal indicative of a reference speed of said motor; motor speed detecting means for detecting a speed of said motor to output a motor speed detection signal; control means responsive to said speed instruction signal and said motor speed detection signal so as to control rotation of said motor on the basis of a difference between said speed instruction signal and said motor speed detection signal; and protection means coupled to said speed instruction means and said control means so as to generate a protection signal to said control means when a motor speed corresponding to said speed instruction signal therefrom is lower than a predetermined speed, said control means stopping the drive of said motor in response to said protection signal therefrom.

In accordance with the present invention, there is still further provided a speed control apparatus for use in a brushless motor comprising: multi-phase drive coil means for driving said motor in response to a feed thereto; position detecting means for detecting a position of a rotor of said motor to output a position detection signal; energization-state instruction means for outputting an energization-state instruction signal on the basis of said position detection signal from said position detecting means to successively switching an energization state of said drive coil means; speed detecting means for detecting a speed of said motor to output a motor speed detection signal; speed instruction means for outputting a speed instruction signal indicative of a reference speed of said motor; duty control means responsive to said speed instruction signal from said speed instruction means so as to output a duty control signal which is supplied to said energization-state instruction means to be combined with said energization-state instruction signal, said duty control signal having a duty ratio whereby said energization-state instruction signal from said energization-state instruction signal is controllable so as to control the feed amount to said drive coil means; and minimum-duty clamping means coupled to said duty control means for limiting said duty ratio of said duty control signal to above a predetermined value.

In accordance with the present invention, there is in addition provided a speed control apparatus for use in a brushless motor comprising: multi-phase drive coil means for driving said motor in response to a feed thereto; position detecting means for detecting a position of a rotor of said motor to output a position detection signal; energization-state instruction means responsive to said position detection signal therefrom to output an energization-state instruction signal to successively switch an energization state of said drive coil means; speed detecting means for detecting a speed of said motor to output a signal indicative of the detected motor speed; speed instruction means for outputting a speed instruction signal indicative of a speed at which said motor is driven; phase error detecting means responsive to said speed detection signal from said speed detecting means and said speed instruction signal from said speed instruction means so as to output a rectangular wave signal with a duty ratio which corresponds to a phase error therebetween; phase error voltage means for outputting a voltage corresponding to said duty ratio of the output signal of said phase error detecting means; triangular wave generating means for generating a triangular wave signal; pulse signal generating means for comparing the output signal of said phase error voltage means with said triangular wave signal from said triangular wave generating means so as to output a pulse signal with a duty ratio; combination means for combining the output signal of said pulse signal generating means with the output signal of said phase error detecting means, the combination signal being supplied to said energization-state instruction signal so as to control the feed amount to said drive coil means so that said speed detection signal from said speed detecting means is coincident in frequency with said speed instruction signal from said speed instruction means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
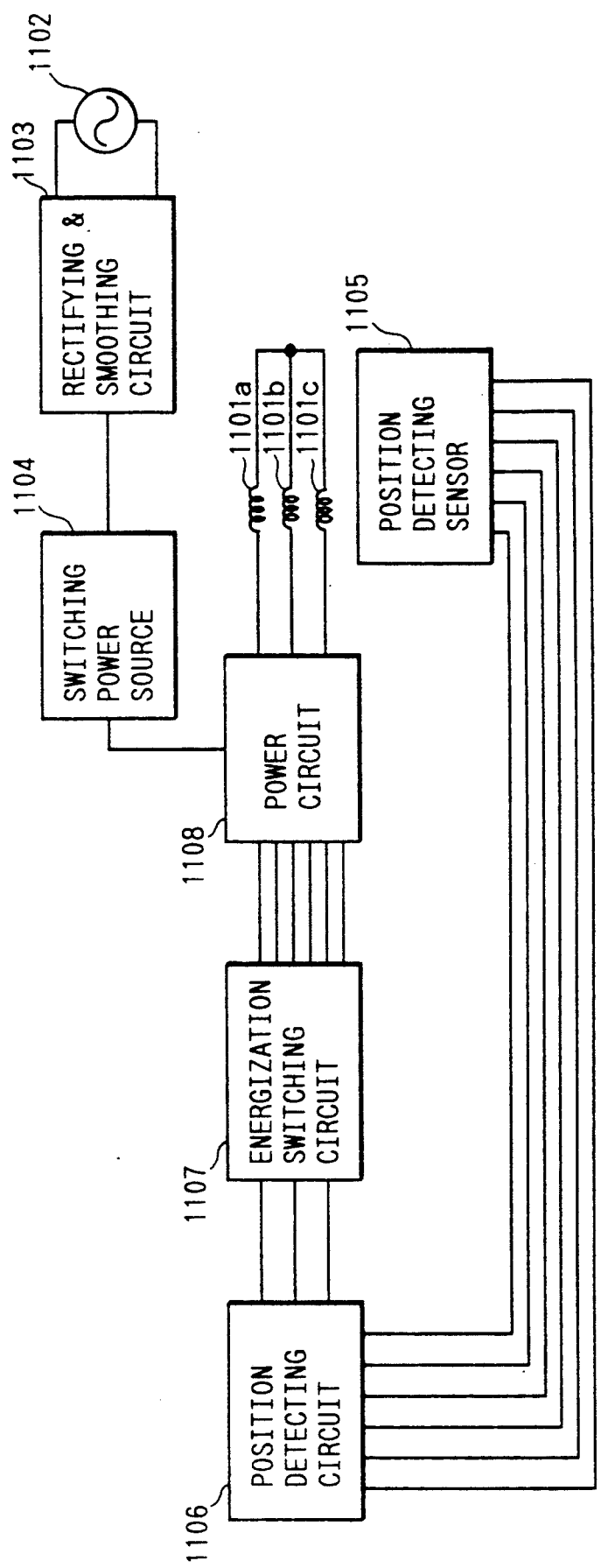
FIG. 1 is a block diagram showing a conventional arrangement of a drive apparatus of a brushless motor.
Figure 2:
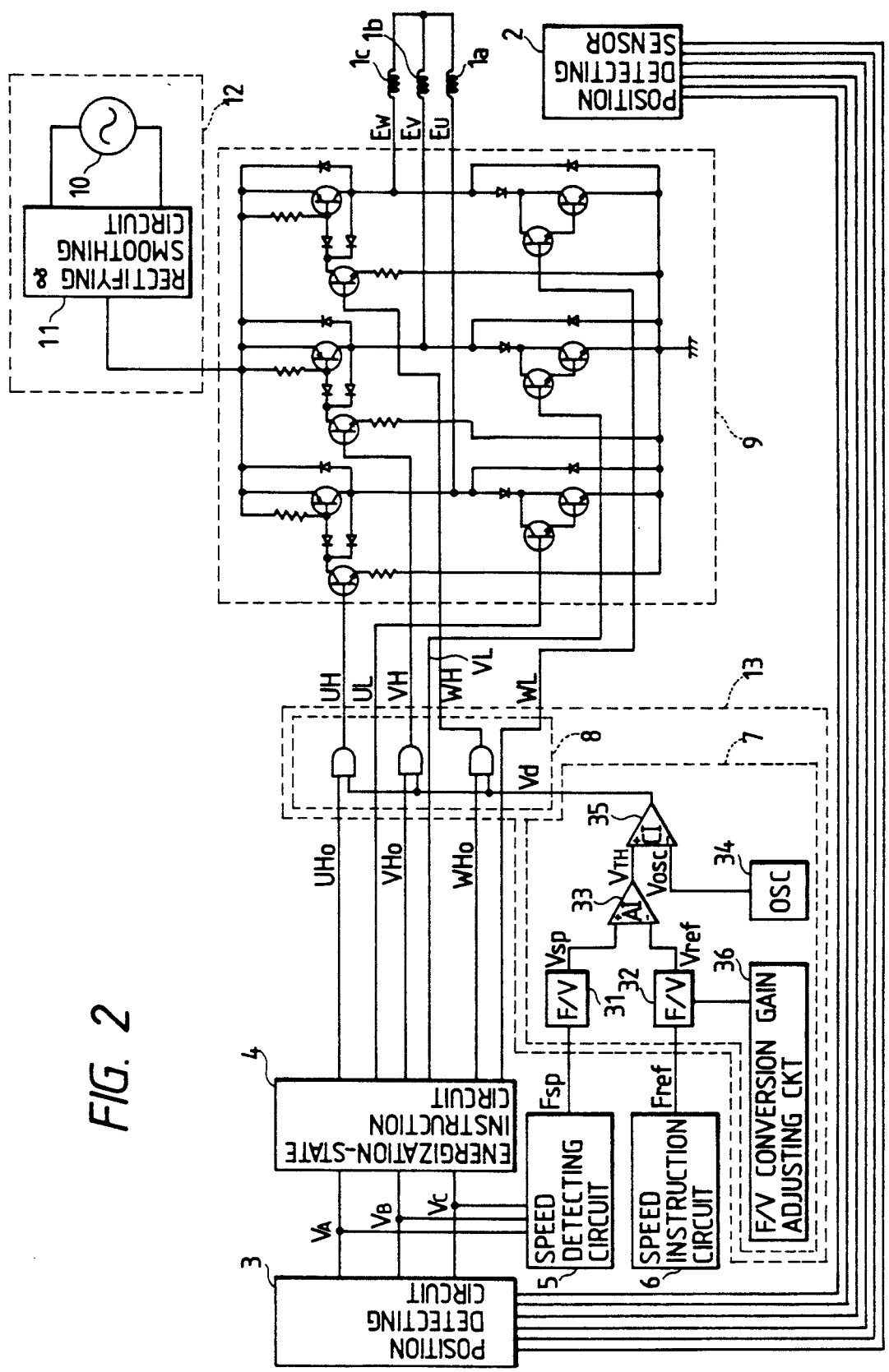
FIG. 2 is a circuit diagram showing an arrangement of a drive apparatus of a brushless motor according to a first embodiment of the present invention.
Figure 3:
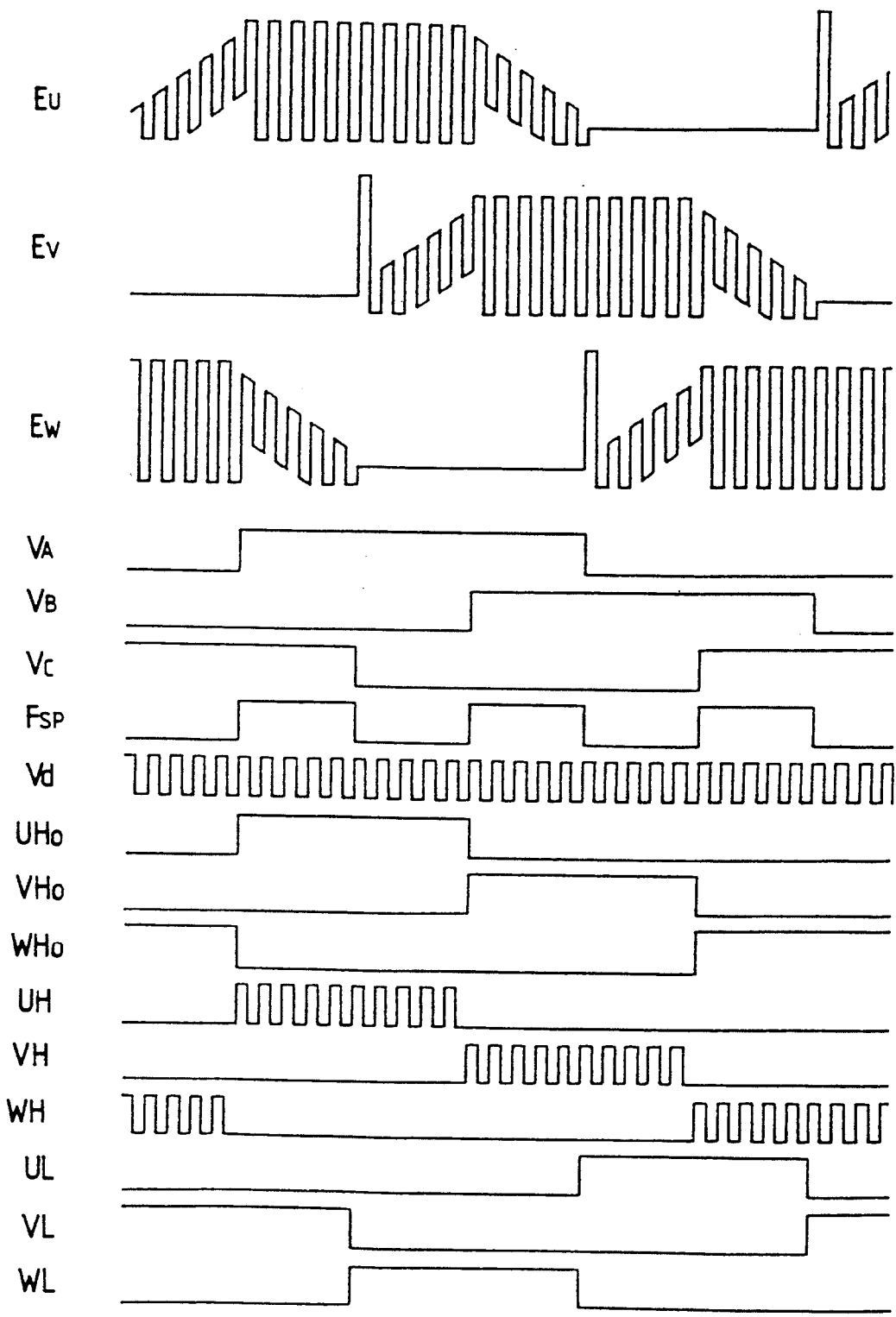
FIG. 3 is an illustration of waveforms of operation signals for the FIG. 2 drive apparatus.

Referring now to FIG. 2, there is illustrated a drive apparatus of a brushless motor according to a first embodiment of the present invention. In FIG. 2, illustrated at 1a, 1b and 1c are drive coils coupled to a power circuit 9. The output signal of a position detecting sensor 2 is inputted to a position detecting circuit 3, the output signal of which is inputted to an energization-state instruction circuit and further to a speed detection circuit 5. To a PWM (pulse width modulation) circuit 13 are inputted the output signal of the speed detection circuit 5 and the output signal of a speed instruction circuit 6. The output signal of the energization-state instruction circuit 4 is also inputted to the PWM circuit 13. To said power circuit 9 are inputted the output signal of a direct-current (dc) voltage applying means 12 and further the output signal of the PWM circuit 13. The PWM circuit 13 is provided for changing the ON/OFF time ratio of the application voltage to the motor in accordance with the pulse width to control the applied average voltage to the motor. Secondly, a description will be made in detail with reference to FIG. 3 in addition to FIG. 2 in terms of circuit operation of the brushless motor drive apparatus, with the above-mentioned arrangement, according to the first embodiment of this invention. In FIG. 3, characters $V_A$, $V_B$ and $V_C$ respectively represent the waveforms of position detection signals of a rotor. The position detection signals are logically processed as follows in the energization-state instruction circuit 4 so as to obtain energization-state instruction signals UHo, VHo, WHo, UL, VL and WL.

UHo : logical product (AND) of $V_A$ and $\overline{V_B}$
VHo : logical product of $V_B$ and $\overline{V_C}$
WHo : logical product of $V_C$ and $\overline{V_A}$
UL : logical product of $V_B$ and $\overline{V_A}$
VL : logical product of $V_C$ and $\overline{V_B}$
WL : logical product of $V_A$ and $\overline{V_C}$ where $\overline{V_A}$, $\overline{V_B}$ and $\overline{V_C}$ are inversion signals of $V_A$, $V_B$ and $V_C$, respectively.

FIG. 3 shows waveforms of operations signals of the drive apparatus illustrated in FIG. 2, and in FIG. 3 the energization-state instruction signals UHo, VHo, WHo, UL, VL and WL become as illustrated in FIG. 3. Further, in FIG. 3, character Vd designates the output signal of a duty control circuit 7 which is an ON/OFF signal as illustrated. The output signal Vd of the duty control circuit 7 is logically processed as follows in an energization switching circuit 8 so as to obtain energization switching signals UH, VH, WH, UL, VL and WL.

UH : logical product of UHo and Vd
VH : logical product of VHo and Vd
WH : logical product of WHo and Vd
UL : UL
VL : VL
WL : WL These energization switching signals UH, VH, WH, UL, VL and WL are respectively inputted an input base of a transistor of the power circuit 9. For instance, when the signals UH and VL are respectively in the high-level (H) states, current is arranged to flow from the U-phase drive coil to the V-phase drive coil, and on the other hand, when the signals UH and WL are respectively in the H states, current follows from the U-phase drive coil to the W-phase drive coil, whereby the exciting states of the drive coils are successively switchable to result in rotation of the motor. Further, the control of the ON time of the signal Vd allows current flowing through the drive coil to change the rotational speed of the motor.

Figure 4:
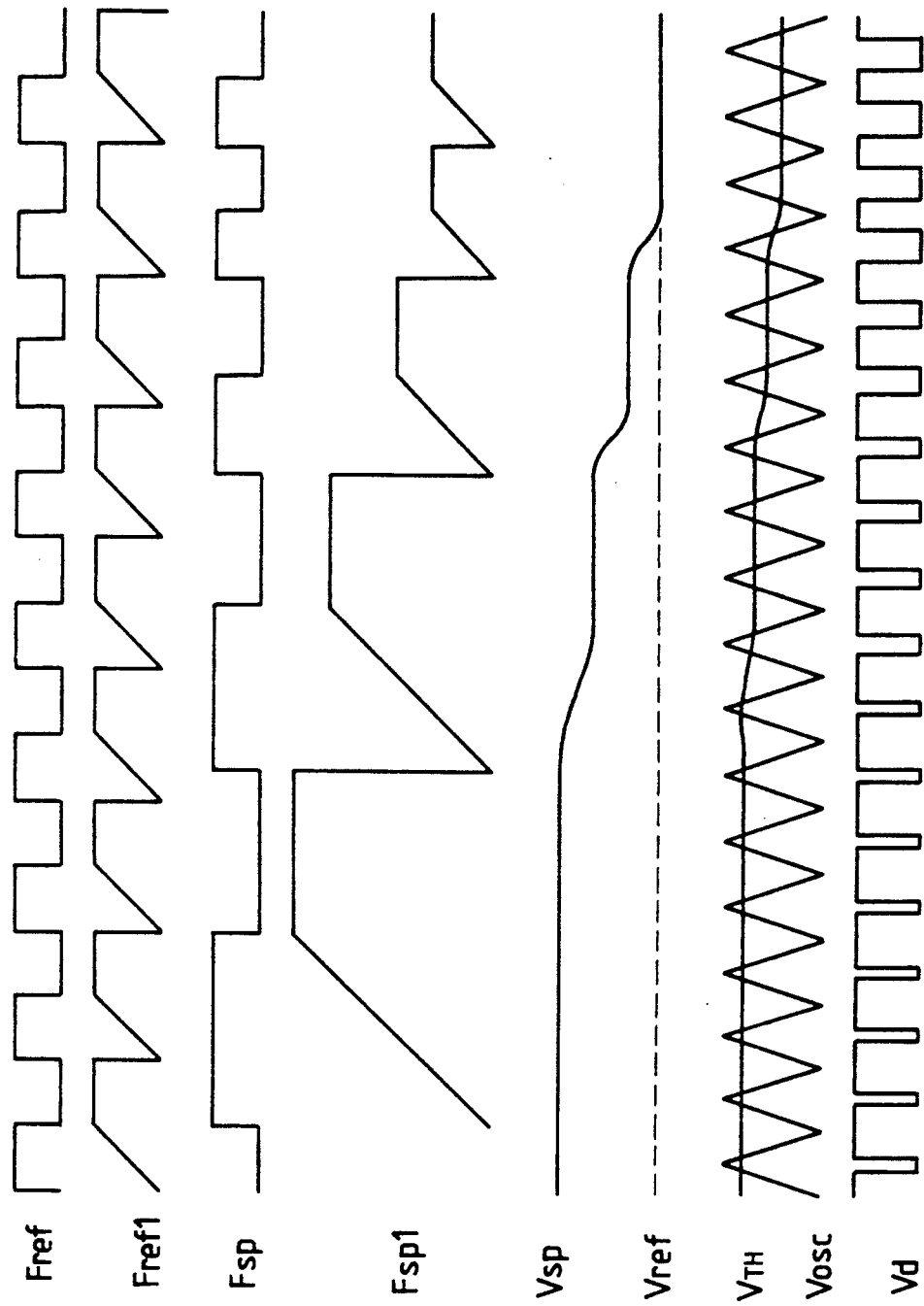
FIG. 4 shows waveforms of operation signals for a PWM circuit of the FIG. 2 drive apparatus.

Secondly, a description will be made hereinbelow with reference to FIG. 4 in addition to FIG. 2 in terms of means for changing the rotational speed of the motor. FIG. 4 illustrates waveforms of operation signals of the PWM circuit 13, where Fref depicts a speed instruction signal. A F/V converter 32 (FIG. 2) converts the speed instruction signal Fref into an analog voltage signal Vref. That is, when the speed instruction signal Fref is in the high-level state, a capacitor is charged with a constant current, and when signal Fref is in the low-level state, the voltage is held so as to be rapidly discharged at the time of the signal Fref becoming in the high-level state, thereafter again charged with the constant current. This operation allows conversion of the signal Fref into a signal Frefl as illustrated in FIG. 4. The hold voltage of the signal Frefl is outputted as the analog voltage signal Vref. That is, the analog voltage signal Vref varies in accordance with the frequency of the signal Fref, and the electric potential of the voltage signal Vref lowers in accordance with the frequency of the signal Fref lowering and heightens in accordance with the frequency thereof heightening.

In FIG. 4, character Fsp represents a speed detection signal of the motor which can be obtained by performing the following logical processing with respect to the position detection signal.

$$Fsp : (V_A \cdot V_B \cdot \overline{V_C}) + (V_A \cdot \overline{V_B} \cdot V_C)(\overline{V_A} \cdot V_B \cdot V_C)$$

where . represents the logical produce (AND) and +denotes the logical sum (OR).

The speed detection signal Fsp can be converted into an analog voltage signal Vsp in accordance with a method similar to the method for the signal Fref. Thus, when the rotational speed of the motor increases, the frequency of the signal Fsp becomes higher so as to lower the electric potential of the voltage signal Vsp. On the other hand, when the rotational speed of the motor decreases, the frequency of the signal Fref becomes lower so as to heighten the electric potential of the voltage signal Vsp. Here, when the rotational speed of the motor is low with respect to the speed instruction signal Fref, the voltage signal Vsp becomes higher than the voltage signal Vref to thereby increase the electric potential of the output $V_{TH}$ of a speed error amplifying circuit 33 the output of which is coupled to a PWM comparator 35. The PWM comparator 35 compares the output $V_{TH}$ with the output Vosc of an OSC (oscillator) 34 so as to produce and output the signal Vd. At this time, since the ON time of the signal Vd lengthens to increase the motor current, the rotational speed of the motor increases so as to become Vsp =Vref, i.e., Fsp =Fref. Further, when the rotational speed of the motor is high with respect to the signal Fref, the ON time of the signal Vd decreases to reduce the motor current, thereby resulting in Fsp =Fref. That is, it is possible to easily and accurately control the rotational speed of the motor by means of the speed instruction signal Fref.

Figure 5:
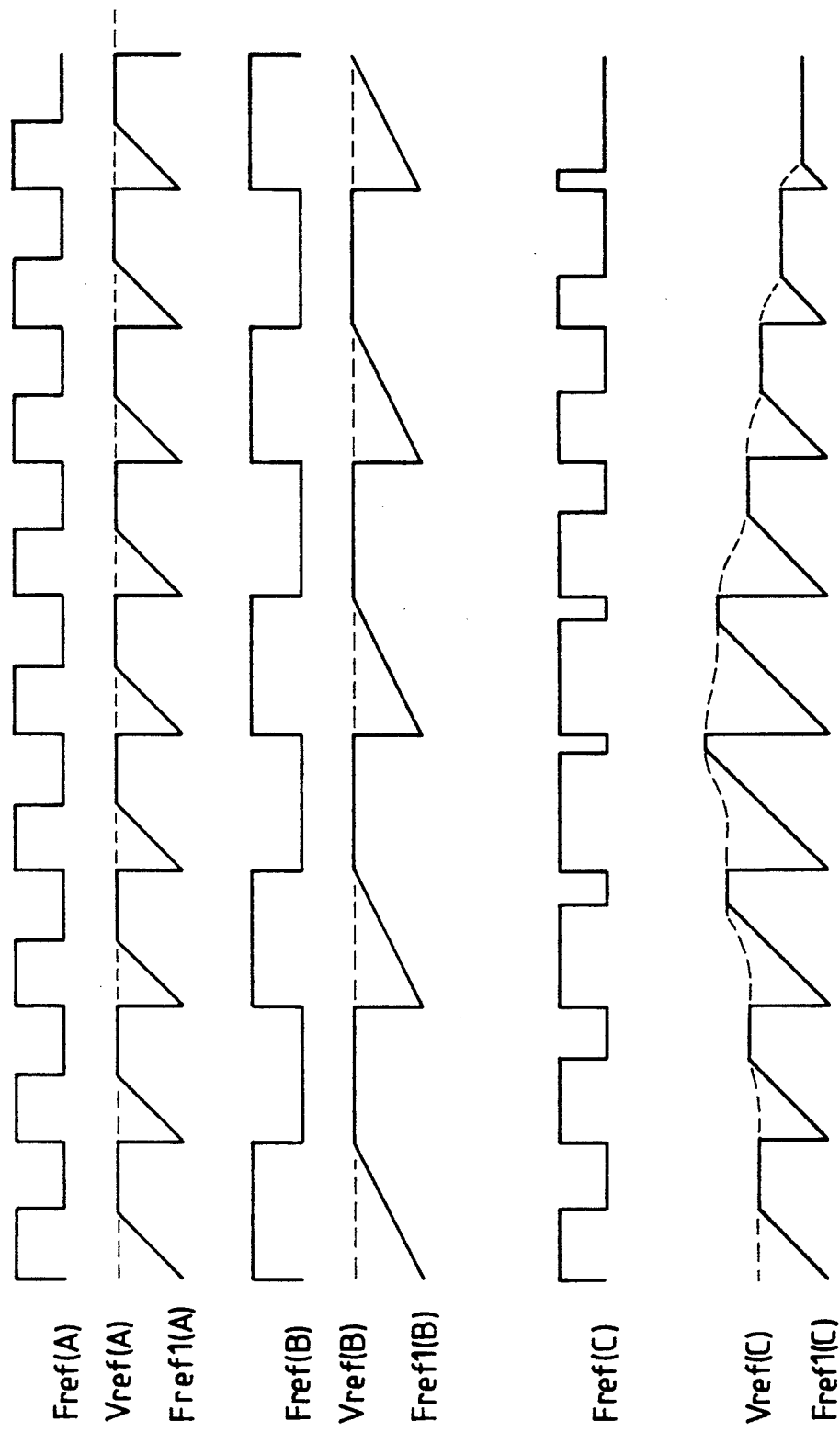
FIG. 5 illustrates waveforms of operation signals for a second F/V converter of the FIG. 2 drive apparatus.

A further description will be made hereinbelow with reference to FIG. 5 in addition to FIG. 2 terms of the speed instruction signal Fref and the F/V converter. FIG. 5 shows waveforms of operation signals for a second F/V converter illustrated in FIG. 2. In FIG. 2, the duty control circuit 7 converts the speed instruction signal Fref into the speed instruction voltage Vref and further converts the speed detection signal Fsp into the speed detection voltage Vsp, thereby controlling the rotational speed of the motor so as to be Vref =Vsp. Thus, the rotational speed of the motor is determined unconditionally with respect to the frequency of a given speed instruction signal Fref. In FIG. 5, Fref(A) represents the case that the frequency of the speed instruction signal Fref is high, and Fref(B) denotes the case that the frequency thereof is low. At this time, a F/V conversion gain adjusting circuit 36 adjusts the F/V conversion gain, more specifically adjusts the value of the constant current to be charged into the capacitor so as to obtain Vref(A) =Vref(B) in the case of Fref(A) =Fref(B). That is, it is possible to set the rotational speed of the motor to the same value even if the frequencies are different from each other. In other words, it is possible to cope with the signal Fref in any frequency ranges.

Furthermore, even if the ON/OFF ratio of the signal Fref varies as a signal Fref(C) shown in FIG. 5, the voltage signal Vref varies to thereby cope with the case that the speed instruction signal Fref is given with the ON/OFF ratio. In addition, the signal Fref is a digital signal which can in turn be treated through an element such as a photocoupler, and hence the motor drive system can be insulated from the motor control system so as to eliminate the affect of noises introduced from the motor drive system into the motor control system.

Figure 6:
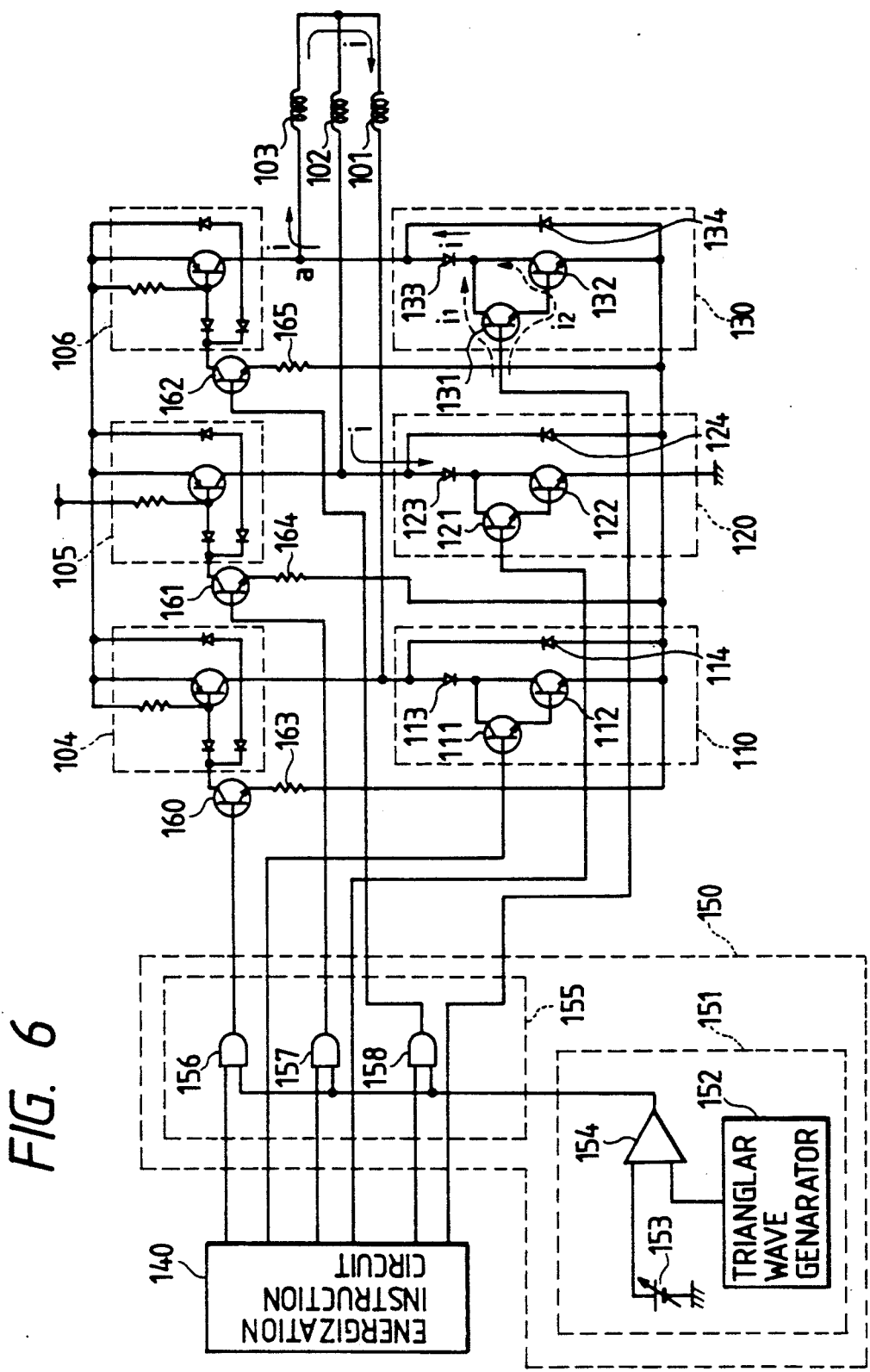
FIG. 6 is a circuit diagram showing an arrangement of a drive apparatus of a brushless motor according to a second embodiment of this invention.

A description will further be made hereinbelow in terms of a drive apparatus of a brushless motor according to a second embodiment of the present invention. FIG. 6 is an illustration of a circuit arrangement of the drive apparatus according to the second embodiment of this invention. In FIG. 6, illustrated at numerals 101 to 103 are drive coils the end portions of which are coupled through first switching means 104 to 106 to a positive power terminal and further coupled through second switching means 110, 120 and 130 to a negative power terminal, respectively. On the other hand, the other end portions of the drive coils 101 to 103 are coupled to each other. To the first switching means 104 to 106 there are coupled the collectors of transistors 160 to 162 whose emitters are respectively coupled through resistors 163 to 165 to the negative power terminal. Further, illustrated at numeral 140 is an energization instruction circuit which generates a signal indicative of an energization switching instruction on the basis of a position detection signal of the rotor of the motor so as to successively drive the drive coils 101 to 103 of the motor. Illustrated at numeral 151 is a PWM signal generator which comprises a comparator 154 to compare a triangular wave signal from a triangular wave generator 152 in voltage with a dc voltage 153, thereby generating a rectangular wave signal, whose ON/OFF duty ratio varies, in accordance with the value of the dc voltage 153. Of the output signals of the energization instruction circuit 140, the signals for actuating the first switching means 104 to 106, together with the output signal of the PWM signal generator 151, are inputted to AND gates 156 to 158 the output signals of which are applied to the bases of the transistors 160, 161 and 162, respectively. On the other hand, of the output signals of the energization instruction circuit 140, the signals for actuating the second switching means 110, 120 and 130 are directly inputted thereto. Illustrated at numeral 150 is a PWM circuit comprising the PWM signal generator 151 and a gate circuit 155.

Further, the second switching means 110, 120 and 130 are composed of transistors 111, 112, 121, 122, 131 and 132 darlington-coupled for acting as switching elements, diodes 113, 123 and 133 connected in series and in forward direction to the collectors of the darlington-coupled transistors 111, 112, 121, 122, 131 and 132, and diodes 114, 124 and 134 coupled in parallel to serial circuits comprising the darlington-coupled transistors 111, 112, 121, 122, 131 and 132 and the diodes 113, 123 and 133.

Operation of the brushless motor drive apparatus thus arranged will be described hereinbelow. The PWM circuit 150 controls the ON/OFF duty of the transistors 160 to 162 with the oscillation frequency of the triangular wave generator 152 being used as the carrier frequency. As a result, the ON/OFF duty of the first switching means 104 to 106 and the second switching means 110, 120 and 130 is controlled, thereby varying the speed by controlling the supply of currents to the drive coils 101 to 103.

Here, a description will be made hereinbelow in terms of the diodes 113, 123 and 133 respectively provided in the second switching means 110, 120 and 130. The description will principally be made with respect to the diode 133. Now, let it be assumed that during the energization instruction ON time to the first switching means 106 and the second switching means 120 the first switching means 106 is ON/OFF-duty-controlled by means of the PWM drive. When the first switching means 106 is in the OFF state, as indicated by an arrow in FIG. 6 current i flows from the second. switching means 120 through the ground and the diode 134 to the drive coils 103 and 102. Accordingly, the electic potential of the junction point between the first and second switching means 106 and 130 becomes a value lower by corresponding to the forward-direction voltage drop of the diode 134 than the ground. At this time, the second switching means 130 is in the energization instruction OFF time state, and therefore the input potential of the base of the switching element 131 becomes the ground potential. Thus, if the diode 133 is not provided, the p-n junction between the base and collector of the switching elements 131 and 132 is biased in the forward direction and currents il and I2 occur as indicated by arrows in FIG. 6. As a result, electric charge is accumulated at the p-n junction surfaces between the bases and collectors of the switching elements 131 and 132. In this state, when the first switching means 106 turns into the ON state, the electric potential at the junction point rapidly increases so that the accumulated electric charge is discharged instantaneously. That is, the accumulated electric charge to the parasitic capacity equivalently presented between the base and collector thereof is discharged. This instantaneous discharge of the accumulated electric charge provides base currents of the switching elements 131 and 132, and the second switching means 130 instantaneously takes the ON state irrespective of the energization instruction OFF time. As a result, the first and second switching means 106 and 130 instantaneously and simultaneously take the ON states, thereby producing through current. Thus, the generation of the through current results from the fact that, when the first switching means is in the OFF time, the p-n junction between the base and collector of each of the switching elements 131 and 132 is biased in the forward direction and electric charge is accumulated. More specifically, when no charge is accumulated at the p-n junction surface between the base and collector of each of the switching elements 131 and 132, the above-mentioned through current does not occur. Accordingly, in this embodiment, even if the first switching means 106 is in the OFF state and the p-n junction between the base and collector of each of the switching element 131 and 132 is biased in the forward direction, the flow of electric charge between the base and collector of the switching elements 131 and 132, i.e., currents il and i2, is suppressed by means of the diode 133 so as not to accumulate the electric charge. That is, the generation of the currents il and il is prevented by means of the diode 133 so as to suppress the accumulation of electric charge at the p-n junction surface between the base and collector of each of the switching elements 131 and 132 which causes the generation of the through current. Thus, the through current instantaneously generated when the first switching means 106 turns from the OFF state to the On state can be prevent or reduced by means of the diode 133. Although the description has mainly been made in terms of the diode 133, the diodes 113 and 123 can provide the same effect.

As described above, according to this embodiment, the electric charge accumulation at the p-n junction surface between the base and collector of each of the transistor 111, 112, 121, 122, 131 and 132, which causes the generation of the through current, is arranged to be suppressed by means of the diodes 113, 123 and 133, thereby allowing prevention of damage of the elements. Simultaneously with this, it is possible to reduce the heat and power line noises due to the through current.

Figure 7:
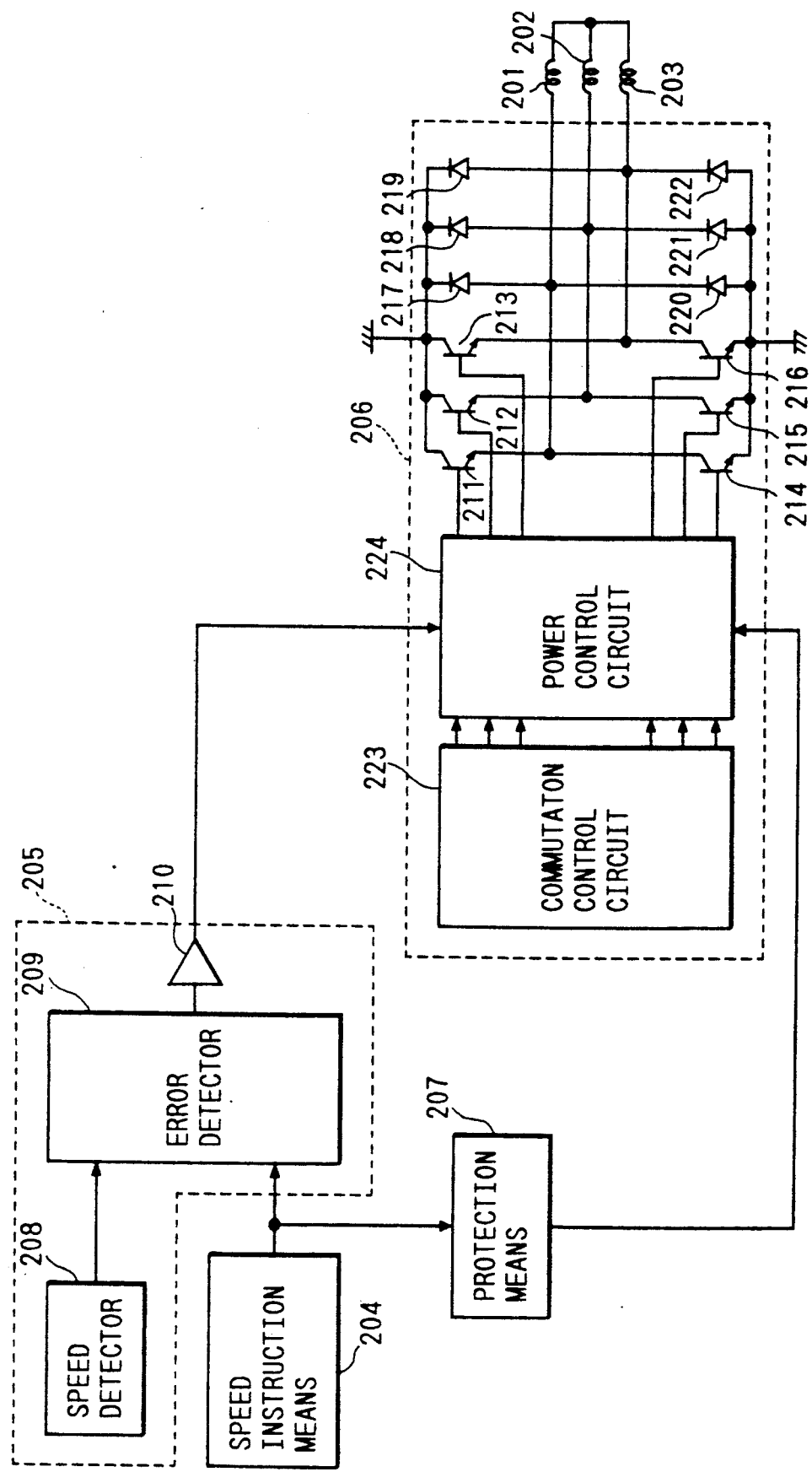
FIG. 7 is a block diagram showing an arrangement of a speed control apparatus according to a third embodiment of this invention.

A description will be made hereinbelow in terms of a speed control apparatus of a brushless motor according to a third embodiment of this invention. FIG. 7 shows a circuit arrangement of the speed control apparatus of the brushless motor according to the third embodiment of this invention. In FIG. 7, illustrated at numerals 201 to 203 are motor drive coils first ends of which are coupled to each other and the other ends of which are coupled to the emitters of drive transistors whose collectors are connected to a positive feed line, coupled to the collectors of drive transistors 214 to 216 whose emitters are grounded, coupled to the anodes of diodes 217 to 219 whose cathodes are connected to the positive feed line, and further coupled to the cathodes of diodes 220 to 222 whose anodes are grounded. Numeral 223 represents a commutation control circuit for detecting the position of the rotor of the motor so as to output a commutation signal which is in turn inputted through a power control circuit 224 to the respective bases of the drive transistors 211 to 216. Numeral 206 is a motor drive means which comprises the above-mentioned constituting elements 211 to 224. Numeral 204 designates a speed instruction means for outputting an instruction signal which is the motor speed reference. The instruction signal of the speed instruction means 204, together with the output of a speed detector 208 for detecting the speed of the motor, is inputted to an error detector 209. The error detector 209 compares the output of the speed instruction means 204 with the output of the speed detector 208 so as to output an error signal indicative of the comparison result. The output of the error detector 209 is inputted to an error amplifier 210 the output of which is inputted to the power control circuit 224. Numeral 205 is a torque instruction means comprising the respective elements 208 to 210. At the output side of the speed instruction means 204 is provided a protection means 207 the output of which is inputted to the power control circuit 224.

Operation of the motor speed control apparatus thus arranged will be described hereinbelow with reference to FIG. 7. In FIG. 7, the torque instruction means 205 compares the detection signal from the motor speed detector 208 with the motor speed instruction signal from the speed instruction means 204 so as to output as a torque instruction signal a signal corresponding to the difference therebetween. Further, the motor drive means 206 successively performs the control of the power supply to the motor drive coils 201 to 203 in accordance with the torque instruction signal from the torque instruction means 205, thereby driving the motor. That is, as the difference between the motor speed instruction signal outputted from the speed instruction means 204 and the speed signal outputted from the motor speed detector 208 becomes greater, the torque instruction signal level of the torque instruction means 205 becomes greater, and therefore the power supply amount to the motor drive coils also increases, whereby the speed of the motor is controllable so that the motor speed instruction signal outputted from the speed instruction means 204 and the speed signal outputted from the motor speed detector 208 becomes small. As a result, the speed control of the motor can be effected in accordance with the motor speed instruction signal outputted from the speed instruction means 204.

Here, difficulty can be encountered to stably perform the motor speed control in accordance with the speed instruction signal directing to a lower-speed instruction signal (as the speed indicative of the speed instruction signal becomes lower). More specifically, it is the common practice that the motor speed is detected at every output period by means of a frequency generator (FG) or the like, and in this case the motor speed detection period becomes long when the motor speed is controlled in a range of low speeds, thereby making it difficult to detect the speed variation occuring in the detection period. As a result, the speed detection accuracy of the motor is deteriorated so as to make it difficult to stably perform the motor speed control. The unstable motor speed control causes occurrence of undesirable motor speed variation to generate vibration and noises, thereby lowering the performance of equipment including such a motor. Here, the level of the low-speed instruction to make it difficult to stably perform the motor speed control depends upon the ability of the control unit, while the level thereof is specifically determined in advance taking into account the ability of the control unit. When the speed instruction means 204 generates a speed instruction signal indicative a speed lower than the specifically determined level, in response to this low-speed instruction signal the protection means 207 outputs an instruction signal to the power control circuit 224 so that the drive transistors 211 to 216 take the OFF states. That is, at the time of the generation of the low-sped instruction signal whose level is lower than the specifically determined level, the operation is made so as to stop the motor drive.

As described above, according to this embodiment, in the case that the instruction signal of the speed instruction means 204 has a level lower than the specifically determined level, the protection means 207 is responsive to this state so as to stop the power supply to the drive coils 201 to 203, thereby preventing the vibration and noises occuring due to the unstable speed control.

Figure 8:
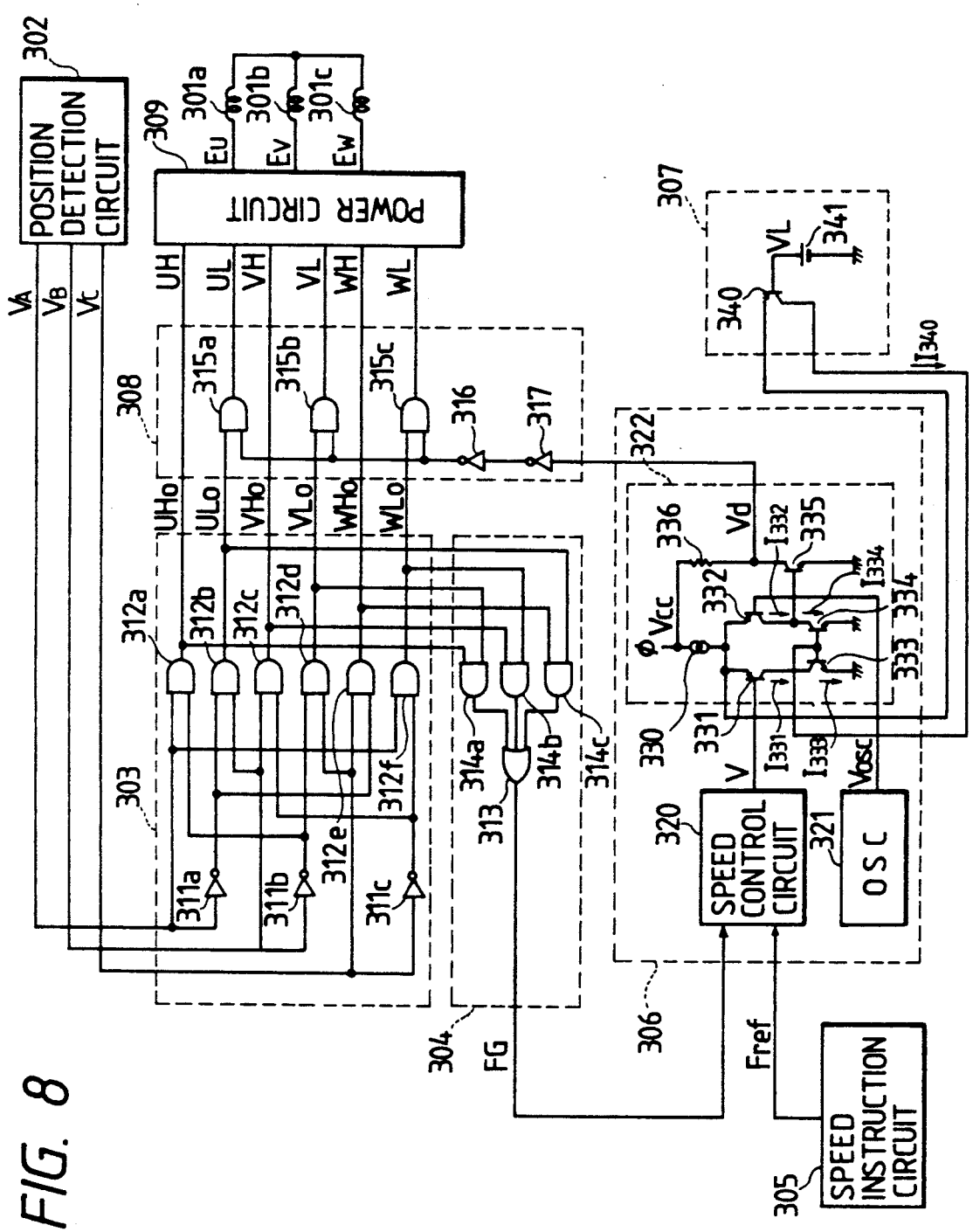
FIG. 8 is a circuit diagram showing an arrangement of a speed control apparatus according to a fourth embodiment of this invention.

Further, a description will be made hereinbelow in terms of a speed control apparatus for a brushless motor according to a fourth embodiment of this invention. FIG. 8 is an illustration of a circuit arrangement of the brushless motor speed control apparatus according to the fourth embodiment of this invention. In FIG. 8, illustrated at numerals 301a to 301c are motor drive coils having first ends which are coupled to an output terminal of a power circuit 309 and other ends which are connected to each other. An output terminal of a position detecting circuit 302 is coupled to an input terminal of an energization-state instruction circuit 303 whose output terminal is coupled to an input terminal of an energization switching circuit 308. The output signal of the energization switching circuit 308 is power-amplified by means of the power circuit 309 so as to successively energize the drive coils 301a to 301c to rotate the motor. A speed detecting circuit 304 outputs a motor speed detection signal FG on the basis of the output signal of the energization-state instruction circuit 303. A speed instruction circuit 305 outputs a motor speed instruction signal Fref which, together with the motor speed detection signal FG, is inputted to a PWM circuit 306. The PWM circuit 306 is for delivering a pulse signal with a duty ratio to the energization switching circuit 308 and is composed of a speed control circuit 320 respectively responsive to the output of the speed detection circuit and the output of the speed instruction circuit 305, an OSC 321, and a PWM comparator 322 respectively responsive to the output of the speed control circuit 320 and the output of the OSC 321. Numeral 307 denotes a minimum-duty clamping circuit to be coupled to the PWM comparator 322 which is a constituting element of the PWM circuit 306.

Figure 9:
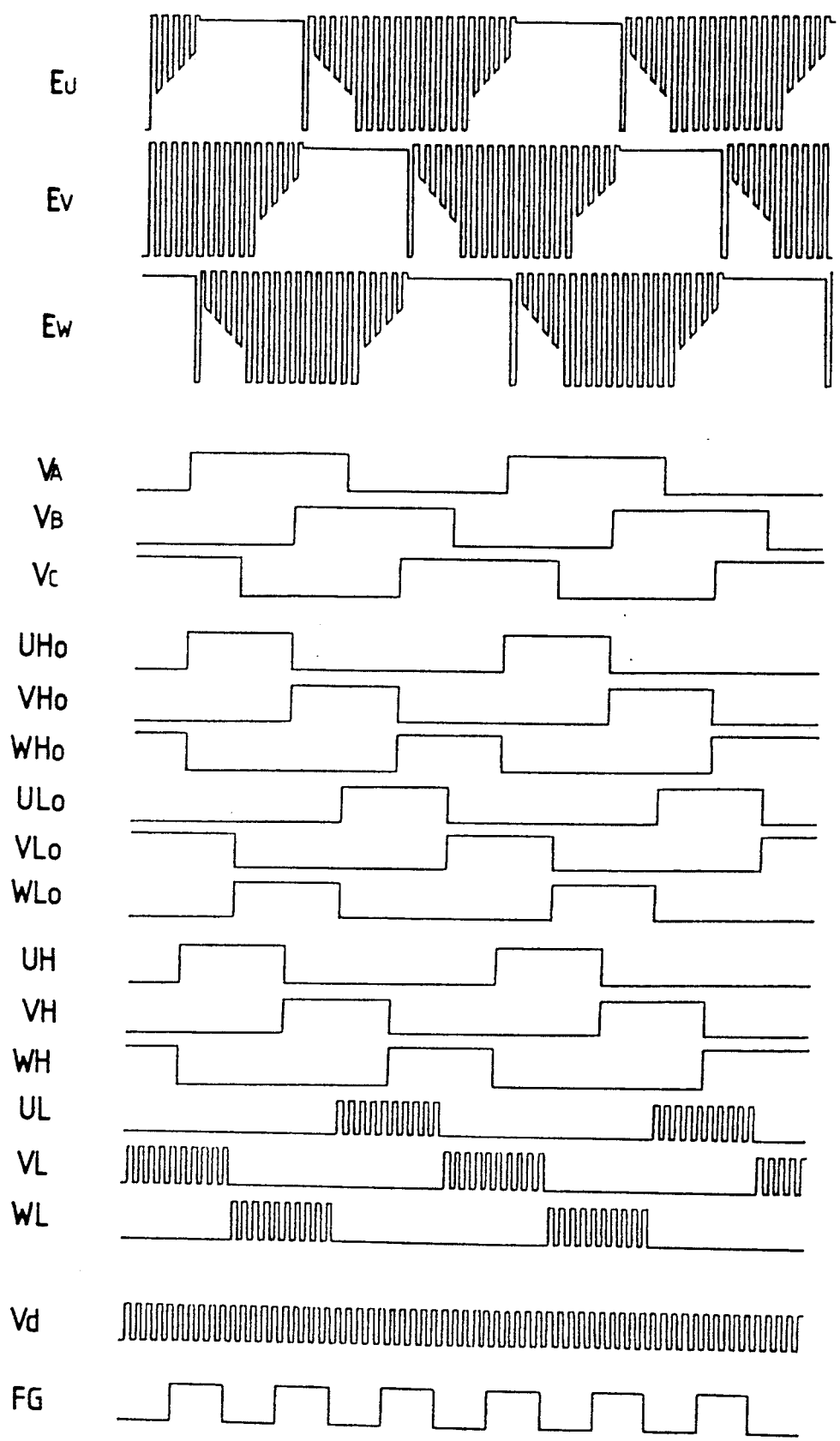
FIG. 9 illustrates waveforms of operation signals for the FIG. 8 speed control apparatus.

Operation of the brushless motor speed control apparatus according to this embodiment of the invention will be described hereinbelow with reference to FIG. 9 in addition to FIG. 8. FIG. 9 is an illustration of waveforms of the operations signals for the FIG. 8 speed control apparatus. In FIG. 9, $V_A$, $V_B$ and $V_C$ respectively represent the waveforms of the rotor position detection signals to be outputted from the position detecting circuit 302. The position detection signals $V_A$, $V_B$ and $V_C$ are logically processed as follows by means of the energization-state instruction circuit 303 so as to obtain energization-state instruction signals UHo, VHo, WHo, ULo, VLo and WLo.

UHo : logical product of $V_A$ and $\overline{V_B}$
VHo : logical product of $V_B$ and $\overline{V_C}$
WHo : logical product of $V_C$ and $\overline{V_A}$
ULo : logical product of $V_B$ and $\overline{V_A}$
VLo : logical product of $V_C$ and $\overline{V_B}$
WLo : logical product of $V_A$ and $\overline{V_C}$ In FIG. 9, Vd is a PWM signal to be outputted from the PWM circuit 306, which is a pulse signal with a duty ratio. The PWM signal Vd is logically processed as follows so as to obtain energization switching signals UH, VH, WH, UL, VL and WL.

UH : UHo
VH : VHo
WH : WHo
UL : logical product of ULo and Vd
VL : logical product of VLo and Vd
WL : logical product of WLo and Vd That is, each of the energization switching signals UH, VH, WH, UL, VL and WL is a signal made by combining (or superimposing) the PWM signal Vd from the PWM circuit 306 with the output of the energization-state instruction circuit 303. These energization switching signals UH, VH, WH, UL, VL and WL are inputted to the power circuit 309 so as to successively energize the drive coils 301a to 301c. For instance, when the signals UH and VL are in the high-level states, current flows from the drive coil 301a to the drive coil 301b. Further, the signals UH and WL are in the high-level states, current flows from the drive coil 301a to the drive coil 301c. With this arrangement, the energization states of the drive coils 301a to 301c are successively switched to thereby drive the motor.

Secondly, a description will be made hereinbelow in terms of the variable speed control of the motor. In FIG. 9, the motor speed detection signal FG can be obtained by performing the following processing the position detection signals $V_A$, $V_B$ and $V_C$.

FG : $(V_A \cdot V_B \cdot \overline{V_C} + (V_A \cdot \overline{V_B} \cdot V_C) + (\overline{V_A} \cdot V_B \cdot V_C)$ where . represents the logical product and +denotes the logical sum.

When the motor speed increases, the frequency of the detection signal FG becomes high. First, consideration is made such that the relation between the frequency $f_{FG}$ of the detection signal FG and the frequency $f_{Fref}$ is $f_{FG} > f_{Fref}$. At this time, the electric potential of the output signal V of the speed control circuit 320 increases whereby the duty ratio of the PWM signal Vd to be outputted from the PWM comparator 322 is decreased so as to reduce the feed amounts to the drive coils 301a to 301c, thereby lowering the speed of the motor. Secondly, let it be assumed that the motor speed decreases, the frequency of the signal FG lowers and the relation between the frequencies $f_{FG}$ and $f_{Fref}$ becomes $f_{FG} < f_{Fref}$. At this time, the potential of the output signal V of the speed control circuit 320 lowers whereby the duty ratio of the PWM signal Vd to be outputted from the PWM comparator 322 decreases so as to increase the feed amounts to the drive coils 301a to 301c, thereby heightening the speed of the motor. As a result, the motor speed is controlled such that the frequency $f_{FG}$ of the speed detection signal FG becomes coincident with the frequency $f_{Fref}$ of the speed instruction signal Fref.

Figure 10:
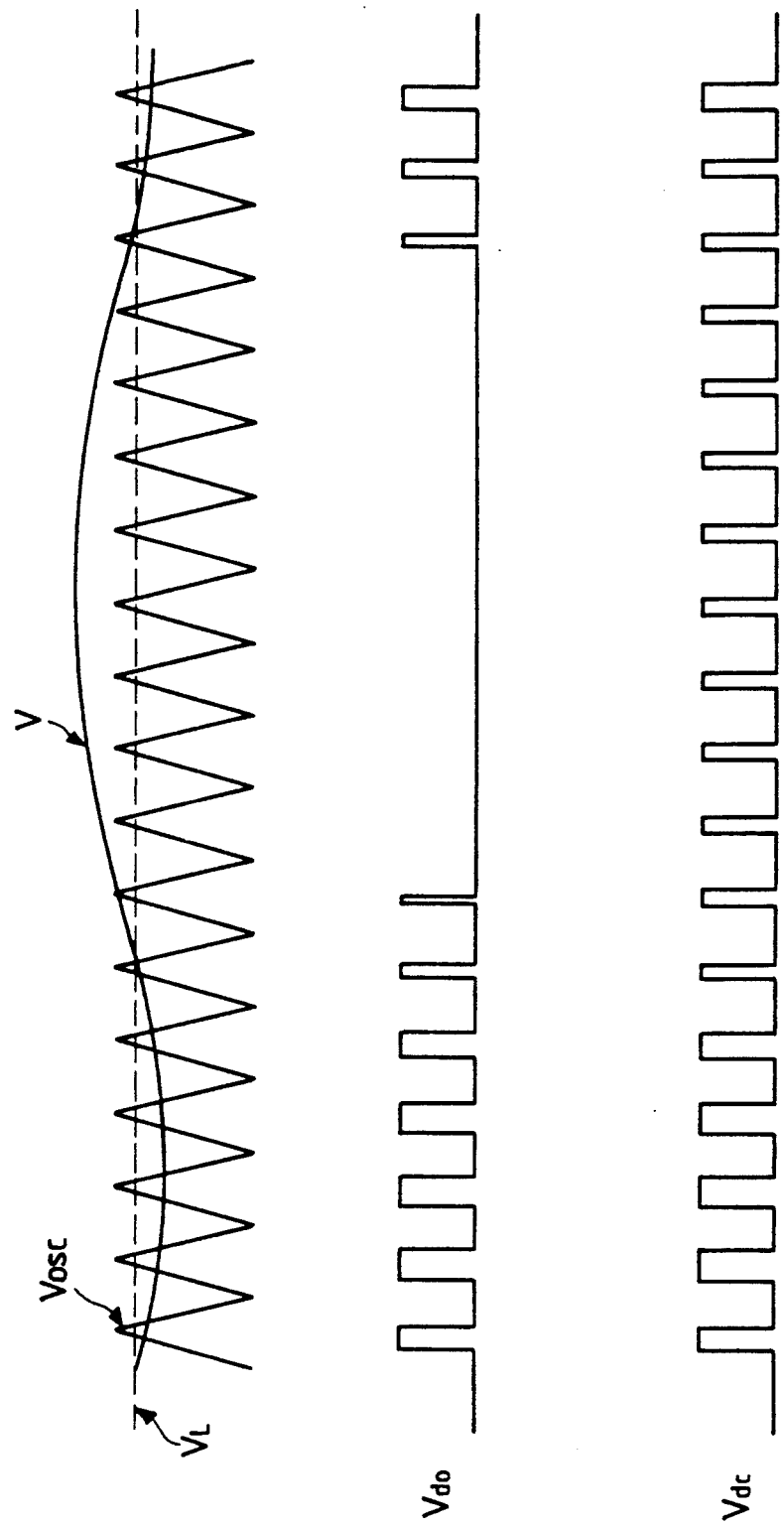
FIG. 10 shows waveforms of operation signals for a PWM circuit and a minimum-duty clamping circuit of the FIG. 8 speed control apparatus.

Further, a description will hereinbelow be made in detail in terms of the operations of the PWM circuit 306 and minimum-duty clamping circuit 307. FIG. 10 illustrates waveforms of the operation signals for the PWM circuit 306 and minimum-duty clamping circuit 307. In FIG. 10, V represents the output signal of the speed control circuit 320, Vosc denotes a triangular wave signal to be outputted from the OSC 321. The PWM comparator 322 is a differential amplifier comprising transistors 331 to 335, a constant current source 330 and a resistor 336. The signals V and Vosc are respectively inputted to the bases of the transistors 331 and 332. When the currents flowing through the transistors 331 to 334 are taken to be $I_{331}$ to $I_{334}$, if there is not provided the minimum-duty clamping circuit 307, the current $I_{331}$ becomes smaller than the current $I_{332}$ when V > Vosc. The transistors 333 and 334 make up a current mirror circuit, i.e., $I_{331} = I_{334}$. Further, since $I_{331} = I_{333}$, the current $I_{332}$ becomes greater than the current $I_{334}$. At this time, since the transistor 335 turns ON to the voltage drop occurs across the resistor 336, the PWM signal Vd turns to the Low-level state. On the other hand, when V < Vosc, the transistor 335 takes the OFF state whereby the PWM signal Vd takes the high-level state. In this state, the operation waveform Vdo (=Vd) becomes as illustrated in FIG. 10. When the signal Vdo is in the high-level state, the feed to the motor occurs. On the other hand, when the signal Vdo is in the low-level state, the feed to the motor stops.

Here, in cases where the motor is controlled at a low speed, the feed amount to the motor is not required to be large. Thus, the signal V approaches the upper limit of the signal Vosc and the duty ratio of the PWM signal Vdo is controlled so that the feed amount to the drive coils 301a to 301c decreases (the low-level time period of the signal Vdo lengthens). However, the signal V has a ripple whose basic wave is coincident in frequency with the motor speed detection signal FG, and when the signal V approaches the upper limit of the signal Vosc, a time period is taken where the ripple voltage of the signal V exceeds the upper limit of the signal Vosc. In the case that the ripple voltage of the signal V exceeds the upper limit of the signal Vosc, during this time period the PWM signal Vdo is not a pulse signal but is fixedly set to be in the low-level state, thereby stopping the feed to the drive coils 301a to 301c. The time period that the ripple voltage of the signal V exceeds the upper limit of the signal Vosc to stop the feed to the drive coils 301a to 301c is relatively long with respect to the oscillation frequency (a general carrier frequency in the PWM control) of the signal Vosc and is repeatedly made with a period of the ripple voltage of the signal V. That is, the feed to the drive coils 301a to 301c is effected or stopped with a period of the ripple voltage of the signal V. Such a state is so-called intermittent operating state. The intermittent operating state causes vibration and unstable rotation, and if the cycle period of the intermittent operating state is in the audible range, it also causes generation of noises.

A description will be made hereinbelow in terms of the case of provision of the minimum duty clamping circuit 307. The minimum duty clamping circuit 307 is composed of a transistor 340 and a reference voltage source (output voltage : $V_L$) 341. When the current flowing through the transistor 340 is taken as $I_{340}$, the current $I_{333}$ becomes equal to the sum of the currents $I_{331}$ and $I_{340}$, i.e., $I_{333} = I_{331} + I_{340}$. $V > V_L$ causes $I_{331} << I_{340}$, whereby $I_{333}$ approximately becomes equal to $I_{340}$. Accordingly, the duty ratio of the output signal Vd of the PWM comparator 322 depends upon the reference voltage $V_L$. On the other hand, $V < V_L$ causes $I_{331} >> I_{340}$, whereby $I_{333}$ approximately becomes equal to $I_{331}$. Accordingly, the duty ratio of the output signal Vd of the PWM comparator 322 depends upon the output signal V of the speed control circuit 320. That is, the signal Vd becomes as indicated by Vdc in FIG. 10 where there is no time period that the feed to the motor is stopped at the above-mentioned low-speed controlling state, thereby preventing the intermittent operation.

As described above, according to this embodiment, because of provision of the minimum duty clamping circuit 307, it is possible to prevent the intermittent operation of the motor and further to perform the variable speed control in a range from a low speed operation to a high speed operation without occurrence of vibration, unstable rotation and noise.

Figure 11:
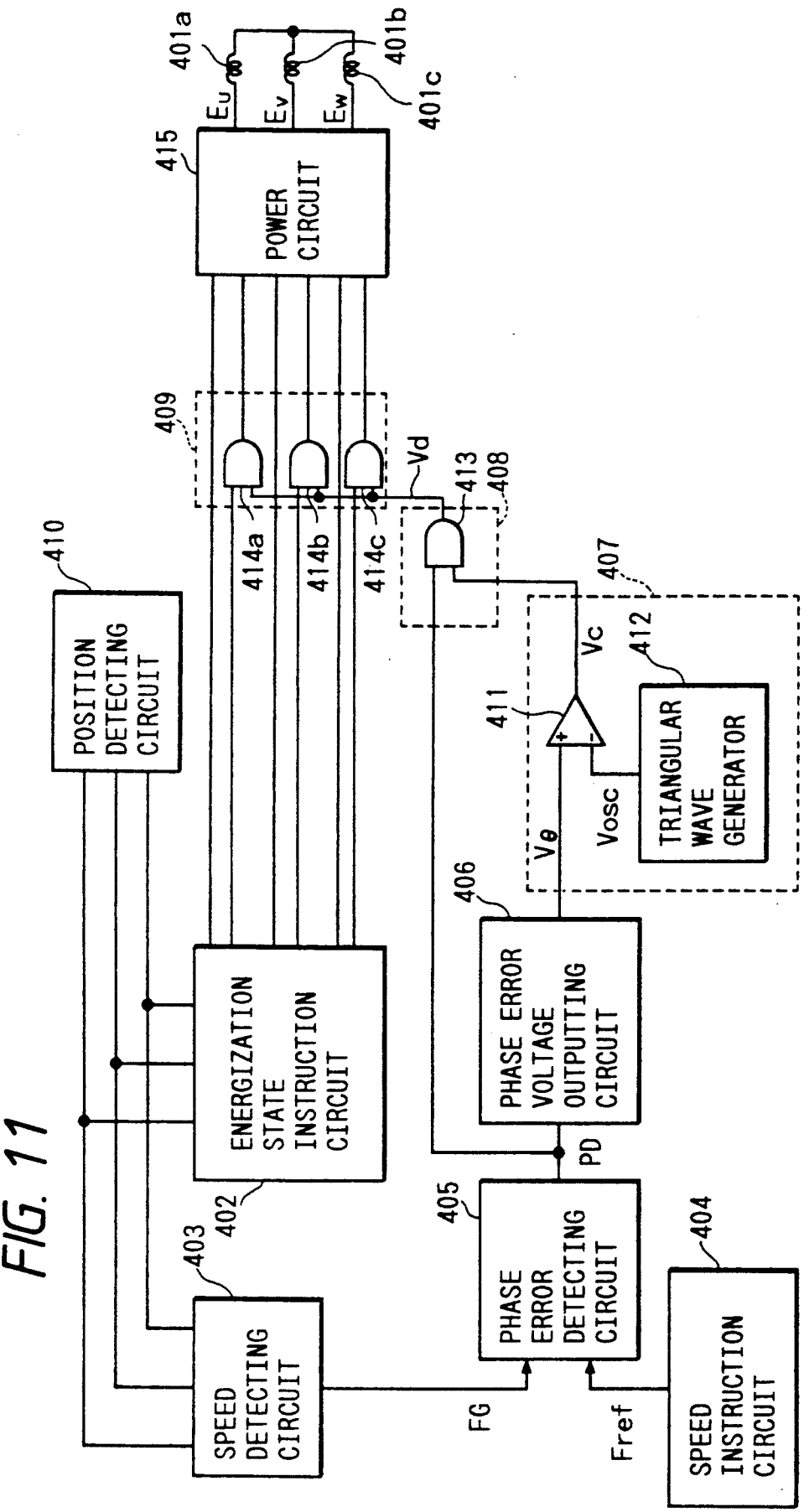
FIG. 11 is a block diagram showing an arrangement of a speed control apparatus according to a fifth embodiment of this invention.

Still further, a description will be made hereinbelow in terms of a brushless motor speed control apparatus according to a fifth embodiment of the present invention. FIG. 11 is an illustration of a circuit arrangement of the brushless motor speed control apparatus according to the fifth embodiment of this invention. In FIG. 11, illustrated, at numerals 401a to 401c are motor drive coils having first ends which are coupled to each other and other ends which are coupled to an output terminal of a power circuit 415. A position detecting circuit 410 outputs a detection signal indicative of the position of the rotor of the motor which is in turn connected to an input terminal of an energization-state instruction circuit 402 and further to an input terminal of a speed detecting circuit 403. An output terminal of the speed detecting circuit 403 and an output terminal of a speed instruction circuit 404 are coupled to an input terminal of a phase error detecting circuit 405. The phase error detecting circuit 405 outputs a rectangular wave signal with a duty ratio which is converted by means of a phase error voltage outputting circuit 406 into a voltage signal corresponding to a phase error. A triangular wave generator 412 outputs a triangular wave signal which, together with the phase error voltage signal converted, is inputted to a comparator 411. A PWM signal to be outputted from the comparator 411 is combined with the output signal of the phase error detecting circuit 405 by means of a double PWM circuit 408. A double PWM signal to be outputted from the double PWM circuit 408, together with the output signal of the energization-state instruction circuit 402, is inputted to an energization switching circuit 409. The output signal of the energization switching circuit 409 is power-amplified through the power circuit 415 so as to successively switch the energization states of the drive coils 401a to 401c, thereby operating the motor.

Figure 12:
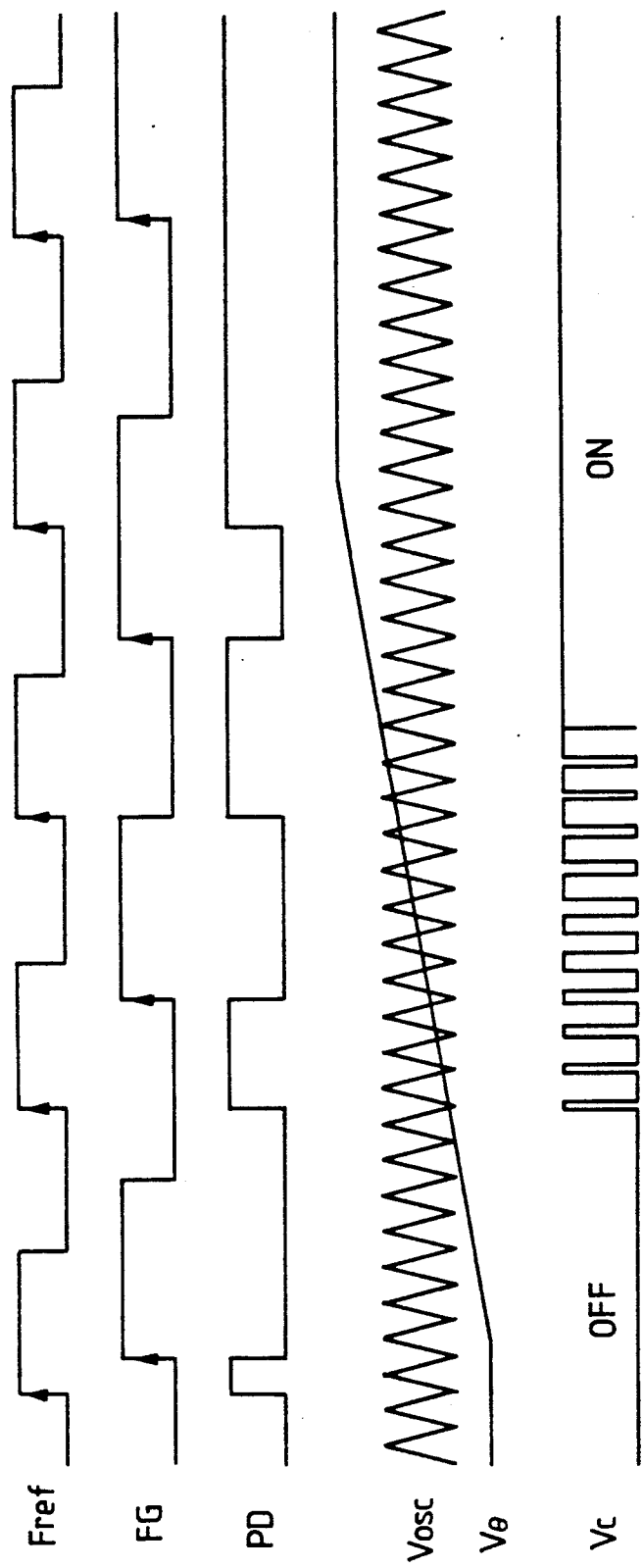
FIG. 12 illustrates waveforms of operation signals for the FIG. 11 speed control apparatus.

Operation of the brushless motor speed control apparatus with such an arrangement according to the fifth embodiment of the invention will be described hereinbelow with reference to FIG. 12 showing the waveforms of operation signals for the FIG. 11 speed control apparatus. In FIG. 12, character FG is a motor speed detection signal to be outputted from the speed detecting circuit 403 and Fref is a speed instruction signal to be outputted from the speed instruction circuit 404. The phase error detecting circuit 405 outputs a rectangular wave signal with a duty ratio as indicated by PD in FIG. 12 which signal corresponds to the phase error between the speed detection signal FG and the speed instruction signal Fref. The duty ratio of the signal PD varies in accordance with the phase error therebetween, and when the frequency of the signal FG becomes lower than that of the signal Fref, the signal PD is always in the high-level state. On the other hand, in response to the frequency of the signal FG becoming higher than that of the signal Fref, the signal PD is always in the low-level state. The signal PD is converted by means of the phase error voltage outputting circuit 406 into a voltage $V_\theta$ corresponding to the duty ratio of the phase error detection signal. When the high-level time period of the signal PD lengthens (the duty ratio increases), the electric potential of the signal $V_\theta$ increases. The triangular wave generator 412 outputs a triangular wave signal which, together with the phase error voltage $V_\theta$, is inputted to the comparator 411. The comparator 411 outputs a pulse signal with a duty ratio as indicated by Vc in FIG. 12. When the pulse signal Vc is in the high-level state, the feed to the motor is executed. On the other hand, when the signal Vc is in the low-level state, the feed to the motor is stopped. Accordingly, when a load is applied to the motor and the phase error between the motor speed detection signal FG and the speed instruction signal Fref enlarges, the feed time period to the motor lengthens whereby the torque of the motor increases so as to reduce the phase error between the motor speed detection signal Fg and the speed instruction signal Fref. In addition, when the frequency of the signal FG becomes higher than the frequency of the signal Fref, the feed to the motor is stopped so as to reduce the phase error therebetween. That is, control is executed so that the motor speed corresponds to the frequency of the speed instruction signal Fref.

Figure 13:
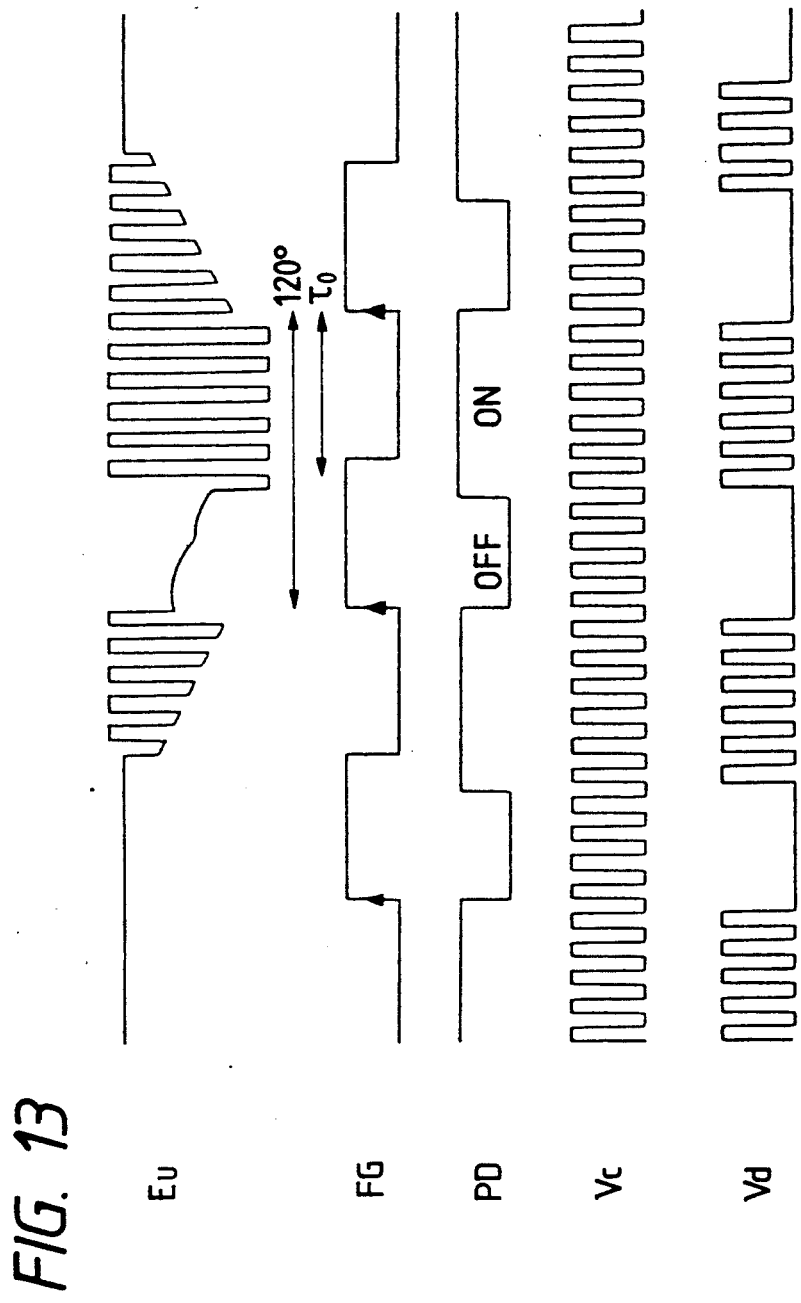
FIG. 13 shows waveforms of operation signals for a drive section of the FIG. 11 speed control apparatus.

Operation of the double PWM circuit 408 will be described hereinbelow. The double PWM circuit 408 can easily be constructed with an AND circuit 413. FIG. 13 shows waveforms of operation signals for the drive section of the FIG. 11 apparatus. In FIG. 13, character Vd is a double PWM signal which can be obtained by taking the logical product of the PWM signal Vc and the phase error signal PD. In the case that the feed to the motor is controlled in accordance with the signal Vd, the induced voltage becomes as indicated by Eu in FIG. 13 and the motor drive control is executed in an interval of electrical angle $\tau_0$ narrower than the normal interval of electrical angle 120°. For controlling the motor at a relative low speed, there is no need to greatly supply the power to the motor. In the case of executing the control with only the PWM signal Vc, the ON time (the time taken for supplying the power to the drive coil) of the signal PD becomes short, and hence the feed amount to the motor is adjusted by reducing the ON time of the signal Vc. At this time, the control is executed in the vicinity of the lower limit of the phase lock range, and therefore the control tends to be unstable. On the other hand, in the case of performing the control on the basis of the double PWM signal Vd, since the drive control is excited in the interval $\tau_0$ shorter than the normal energization electrical angle of 120°, it is required that, for equalizing the total feed amount to the motor to the total feed amount taken when the control is executed with only the PWM signal Vc, the ON time of the signal Vd becomes long. Thus, the ON time of the signal PD lengthens and hence the control operation point approaches the center of the phase lock range. When the ON time of the signal PD shortens so as to cause the duty of the phase error signal PD to approach the lower limit of the phase lock range, the motor control interval $\tau_0$ is shortened and the ON time of the signal Vc is lengthened to compensate for this fact, and therefore the ON time of the signal PD lengthens whereby the control operation point shifts from the lower limit of the phase lock range to the center thereof. This causes a stable control operation. Furthermore, in the case of controlling the motor at a high speed, even if the ON time of the signal PD is lengthened more than required, the ON time of the signal PD is reduced so as to reduce the ON time of the signal Vc. Thus, the total amount of the ON interval of the double PWM signal Vd is determined on the basis of the compensation between the phase error signal PD and the PWM signal Vc, and therefore the operation can be effected at a position close to the center of the phase lock range. That is, it is possible to perform the control in an extremely wide phase lock range in response to a motor-applying voltage $V_M$ and load variation.

As described above, a drive apparatus of a brushless motor according to this invention is arranged such that the ac voltage from the commercial power source is rectified and smoothed so as to be directly supplied to a power source terminal of a power circuit, and this arrangement can provide easy of use as well as an ac motor and allows control of the rotational speed of the motor in accordance with a speed instruction signal without using a switching power source, thereby eliminating coils, capacitors, resistors and others which constitutes the switching power source so as to simplify and reduce the motor drive system in size and weight and hence to considerably reduce the cost. Further, since the rotational speed of the motor is variable in proportion to the frequency of the speed instruction signal or the ratio of the ON time and OFF time of the speed instruction signal, it is possible to accurately perform the variable control of the rotational speed of the motor over a wide range. In addition, with adjustment of the F/V conversion gain, it is possible to perform the control in response to any frequency range and the speed instruction signal with any ON/OFF ratio. Moreover, since the speed instruction signal can be insulated by means of a photocoupler or the like, the motor control system which generates the speed instruction signal is not affected by the motor drive system. Still further, a drive apparatus of a brushless motor of this invention can effectively prevent damage of elements, reduce heating of the elements and improve the anti-noise characteristic of the system.

Further, in a speed control apparatus of a brushless motor according to this invention, a protection means is provided whereby the power supply to the drive coil is controllable to prevent vibration and noises to be generated due to unstable speed control of the motor. In addition, a minimum-duty clamping circuit is additionally provided whereby, for controlling the power supply amount to the motor by changing the duty ratio of a pulse signal from the PWM circuit, the minimum duty ratio of the pulse signal is limited. That is, the speed control is effected so that the feed amount to the motor drive coil keeps or exceeds a predetermined level. Therefore, so-called intermittent operation wherein the feed to the motor is stopped for a time longer than the period of the carrier frequency can be prevented. In this case, the variable-speed control can be effected over a wide range from a low speed to a high speed. It is also possible to realize the apparatus with a simple arrangement and at a low cost. Moreover, the double PWM signal allows the control operation to be made in the vicinity of the center of the phase lock range, thereby permitting stable execution of the speed control over wide range.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A drive apparatus for use in a brushless motor with a rotor and a multi-phase drive coil means for driving said rotor, said drive apparatus comprising:

position detecting means for detecting a position of said rotor to be driven by an energization of said drive coil means;

energization-state instruction means for generating an energization-state instruction signal instructing an energization state of said drive coil means on the basis of the position detection signal from said position detecting means;

energization switching means for outputting an energization switching signal to successively switch the energization state of said drive coil means in accordance with the energization-state instruction signal from said energization-state instruction means and a duty control signal;

power circuit means directly coupled to a direct-current voltage source and responsive to said energization switching signal from said energization switching means so as to energize said drive coil means by means of a direct-current voltage from said direct-current voltage source in accordance with said energization switching signal therefrom, wherein said direct-current voltage source produces said direct-current voltage by directly rectifying and smoothing a power supplied from a commercial power source and said power circuit means is directly connected thereto free of intervening switching power means;

speed detecting means for outputting a motor speed signal on the basis of said position detection signal to be outputted from said position detecting means;

speed instruction means for outputting a speed control signal including a speed command to control a speed of said motor;

duty control means responsive to said speed control signal from said speed instruction means and to said motor speed signal from said speed detecting means for outputting said duty control signal to said energization switching means so that said energization switching means controls a duty ratio of said energization-state instruction signal from said energization-state instruction means on the basis of said duty control signal so as to output said energization switching signal to be inputted to said power circuit means; and low-speed instruction protection means for preventing motor speed control from becoming unstable by determining whether or not said speed command from said speed instruction means is for a motor speed lower than a predetermined value and stopping said power circuit means from energizing said drive coil means when the speed command from said speed instruction means is for a speed lower than said predetermined value.

2. A drive apparatus as claimed in claim 1, wherein said duty control means includes: a first converter coupled to said speed detecting means for converting said motor speed signal into an analog voltage corresponding to a frequency of said motor speed signal; a second converter coupled to said speed instruction means for converting said speed control signal into an analog voltage corresponding to a frequency or a duty ratio of said speed control signal, said duty ratio being a ratio of an ON time that said speed control signal is in a high-level state to an OFF time that it is in a low-level state; a conversion gain adjusting circuit coupled to said second converter for adjusting a conversion gain of said second converter to a predetermined value; a speed error amplifier for amplifying an error between an output signal of said first converter and an output signal of said second converter so as to output an error signal; an oscillator for performing oscillation with a predetermined frequency; and a comparator for comparing said error signal of said speed error amplifier in voltage with an oscillation signal of said oscillator to perform control in accordance with the comparison result so that the rotational speed of said motor becomes equal to a speed corresponding to said ratio of the ON time and OFF time of said speed control signal or corresponding to the frequency of said speed control signal.

3. A drive apparatus for use in a brushless motor having a multi-phase drive coil means for driving a rotor, comprising:

position detecting means for detecting a position of said rotor;

energization-state instruction means for outputting an energization-state instruction signal on the basis of a position detection signal from said position detecting means;

speed detecting means responsive to said position detecting means for outputting a detection signal indicative of a motor speed on the basis of said position detection signal;

speed instruction means for outputting a motor-speed instruction signal;

duty control means responsive to said motor-speed detection signal from said speed detecting means, said motor-speed instruction signal from said speed instruction means, and said energization-state instruction signal from said energization-state instruction means so as to chop an ON time period of said energization-state instruction signal with a carrier frequency to generate an energization switching signal which is supplied to a power circuit means directly coupled to said drive coil means and to a constant direct-current voltage of a constant drive-current voltage source so that a rotational speed of said motor becomes constant in accordance with said motor-speed instruction signal from said speed instruction means, wherein said constant direct-current voltage source produces said constant direct-current voltage by directly rectifying and smoothing a power supplied from a commercial power source and said power circuit means is directly connected thereto free of intervening switching power means; and minimum-duty clamping means coupled to said duty control means for suppressing vibration and rotation variation of said motor during low-speed operation by limiting a duty ratio controlled thereby to a predetermined value.

4. A drive apparatus as claimed in claim 3, wherein said duty control means includes: a first converter for converting said motor speed detection signal into an analog voltage corresponding to a frequency of said motor speed detection signal; a second converter for converting said speed instruction signal into an analog voltage corresponding to a frequency or a duty ratio of said speed instruction signal, said duty ratio being a ratio of an ON time that said speed instruction signal is in a high-level state to an OFF time that it is in a low-level state; a conversion gain adjusting circuit for adjusting a conversion gain of said second converter; a speed error amplifier for amplifying an error between an output signal of said first converter and an output signal of said second converter; an oscillator for performing oscillation with a predetermined frequency; and a comparator for comparing an output voltage of said speed error amplifier and an output voltage of said oscillator so as to perform control so that the rotational speed of said motor becomes coincident with a speed corresponding to said ratio of the ON time and OFF time of said speed instruction signal or corresponding to the frequency of said speed instruction signal.

5. A drive apparatus for use in a brushless motor having multi-phase drive coil means for driving a rotor, comprising:

power source for applying a voltage to said drive coil means;

circuit means comprising first switching means provided between said drive coil means and one terminal of said power source means, and second switching means provided between said drive coil means and another terminal of said power source means;

energization instruction means for successively supplying an energization instruction signal to said first and second switching means; and a pulse width modulation (PWM) circuit for superimposing on said energization instruction signal from said energization instruction means a PWM signal whereby a current feed amount to said drive coil means varies in accordance with a pulse width, so that at least one of said first and second switching means is switching-controlled by said PWM signal superimposed on said energization instruction signal to allow variable speed control of said brushless motor;

wherein at least one of said first and second switching means provided at the opposite power source means terminals to be switching-controlled by said PWM signal comprises a switching element and a diode coupled in series to an output of said switching element in a forward direction.

6. A speed control apparatus for use in a brushless motor comprising:

speed instruction means for outputting a control signal including a speed command indicative of a reference speed of said motor;

torque instruction means for outputting an instruction signal indicative of a power feed amount to said motor so that said motor is driven at a speed corresponding to said control signal from said speed instruction means;

motor drive means for feeding power to said motor on the basis of said instruction signal from said torque instruction means; and low-speed instruction protection means responsive to said control signal from said speed instruction means for preventing motor speed control from becoming unstable by determining independently of motor speed whether or not said speed command in said control signal instructs a motor speed lower than a predetermined value and stopping the power feed to said motor when the speed command in said control signal from said speed instruction means is for a speed lower than said predetermined value.

7. A speed control apparatus for use in a brushless motor comprising:

speed instruction means for outputting a speed control signal including a speed command indicative of a reference speed of said motor;

motor speed detecting means for detecting a speed of said motor and outputting a motor speed detection signal indicative thereof;

control means responsive to said speed control signal and to said motor speed detection signal for controlling rotation of said motor on the basis of a difference between said speed control signal and said motor speed detection signal; and protection means coupled to said speed instruction means and said control means for preventing motor speed control from becoming unstable by determining independently of said motor speed whether said speed command in said speed control signal from said speed instruction means command said motor to operate at a speed lower than a predetermined speed and for generating a protection signal and providing said protection signal to said control means when the speed command included in said speed control signal is lower than said predetermined speed, said control means stopping the drive of said motor in response to said protection signal.

8. A speed control apparatus for use in a brushless motor having a multi-phase drive coil means for driving a rotor in response to a feed thereto, comprising:

position detecting means for detecting a position of said rotor to output a position detection signal;

energization-state instruction means for outputting an energization-state instruction signal to successively switch an energization state of said drive coil means;

speed detecting means responsive to said position detection signal from said position detecting means for detecting a speed of said motor to output a motor speed detection signal;

speed instruction means for outputting a speed instruction signal indicative of a reference speed of said motor;

pulse width modulation (PWM) circuit means for outputting a PWM signal, which controls a current feed amount to said drive coil means in accordance with a pulse duty ratio, in correspondence with a difference between said motor speed detection signal from said speed detection means and said speed instruction signal from said speed instruction means to superimpose the outputted PWM signal on said energization-state instruction signal;

power circuit means for amplifying a power of said energization-state instruction signal, on which said PWM signal is superimposed by said PWM circuit means, to supply an amplified energization-state instruction signal to said drive coil means; and minimum-duty clamping means for, when the current feed amount to said drive coil means corresponding to the difference between said motor speed detection signal from said speed detection means and said speed instruction signal from said speed instruction means takes a low level, limiting a value of said pulse duty ratio of said PWM signal so as to prevent the current feed amount to said drive coil means from going below a predetermined value.

9. A speed control apparatus for use in a brushless motor having a multi-phase drive coil means for driving a rotor in response to a feed thereto, comprising:

position detecting means for detecting a position of said rotor to output a position detection signal;

energization-state instruction means responsive to said position detection signal therefrom to output an energizationstate instruction signal to successively switch an energization state of said drive coil means;

speed detecting means for detecting a speed of said motor to output a signal indicative of the detected motor speed;

speed instruction means for outputting a speed instruction signal indicative of a speed at which said motor is driven;

phase error detecting means responsive to said speed detection signal from said speed detecting means and said speed instruction signal from said speed instruction means so as to output a rectangular wave signal with a duty ratio which corresponds to a phase error therebetween;

phase error voltage mans for outputting a voltage corresponding to said duty ratio of the rectangular wave signal of said phase error detecting means;

triangular wave generating means for generating a triangular wave signal;

pulse signal generating means for comparing the output voltage of said phase error voltage means with said triangular wave signal from said triangular wave generating means so as to output a pulse signal with a duty ratio;

combination means for combining the pulse signal of said pulse signal generating means with the rectangular wave signal of said phase error detecting means, the combination signal being supplied to said energization-state instruction means so as to control the feed amount to said drive coil means so that said speed detection signal from said speed detecting means is coincident in frequency with said speed instruction signal from said speed instruction means.

* * * * *